(12) United States Patent
Nagayama et al.

(10) Patent No.: US 7,157,186 B2
(45) Date of Patent: Jan. 2, 2007

(54) METHOD OF PRODUCING POSITIVE ELECTRODE ACTIVE MATERIAL FOR NON-AQUEOUS ELECTROLYTE SECONDARY BATTERY

(75) Inventors: Masatoshi Nagayama, Hirakata (JP); Hiroshi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 550 days.

(21) Appl. No.: 10/750,861

(22) Filed: Jan. 5, 2004

(65) Prior Publication Data

US 2004/0142241 A1    Jul. 22, 2004

(30) Foreign Application Priority Data

Jan. 9, 2003    (JP)    ............................. 2003-002893

(51) Int. Cl.
*H01M 4/58* (2006.01)
*H01M 4/52* (2006.01)
*C01G 51/00* (2006.01)
*C01G 51/04* (2006.01)

(52) U.S. Cl. .............................. 429/231.3; 429/218.1; 429/231.1; 429/231.6; 252/518.1; 252/519.1; 423/594.5; 423/594.6

(58) Field of Classification Search ............. 252/518.1, 252/519.1; 429/218.1, 231.3, 231.6, 231.1; 423/594.5, 594.6
See application file for complete search history.

(56) References Cited

U.S. PATENT DOCUMENTS

| 6,372,385 B1 * | 4/2002 | Kweon et al. | .......... 429/231.95 |
| 6,569,569 B1 * | 5/2003 | Kweon et al. | ........... 429/231.1 |
| 6,932,922 B1 * | 8/2005 | Gao et al. | ................ 252/521.2 |

FOREIGN PATENT DOCUMENTS

| JP | 5-266889 | 10/1993 |
| JP | 6-338323 | 12/1994 |
| JP | 2001-319652 | * 11/2001 |
| JP | P2002-198051 A | 7/2002 |

* cited by examiner

*Primary Examiner*—Mark Kopec
*Assistant Examiner*—Kallambella Vijayakumar
(74) *Attorney, Agent, or Firm*—McDermott Will & Emery LLP

(57) ABSTRACT

A method of producing a positive electrode active material for a non-aqueous electrolyte secondary battery, comprising the steps of: (a) preparing a raw material mixture, comprising "nx" mol of magnesium, "ny" mol of an element M where the element M is at least one selected from the group consisting of Al, Ti, Sr, Mn, Ni and Ca, "n(1−x−y)" mol of cobalt and "nz" mol of lithium, such that the values n, x, y and z satisfy $0<n$, $0.97 \leq (1/z) \leq 1$, $0.005 \leq x \leq 0.1$, and $0.001 \leq y \leq 0.03$; and (b) baking the raw material mixture in an oxidization atmosphere at 1000 to 1100° C.

3 Claims, 1 Drawing Sheet

METHOD OF PRODUCING POSITIVE ELECTRODE ACTIVE MATERIAL FOR NON-AQUEOUS ELECTROLYTE SECONDARY BATTERY

BACKGROUND OF THE INVENTION

As active materials to be used for positive electrodes of a non-aqueous electrolyte secondary battery, lithium-containing transition metal oxides, such as lithium cobalt oxide, have been widely used. These metal oxides are produced by baking a raw material mixture at a high temperature. The raw material mixture comprises a cobalt salt, a lithium salt or the like. However, an active material exhibits basicity when a lithium salt remains therein; in order to prevent this, there has been proposed that a cobalt content be made higher than a lithium content in a raw material mixture (cf. Japanese Patent No. 3252433).

With a cobalt content made higher than a lithium content in a raw material mixture, on the other hand, a by-product, such as cobalt oxide ($Co_3O_4$), may be mixed into an active material to cause a decrease in capacity of a battery or gas generation. There has hence been proposed as opposed to the above proposal that a lithium content be made higher than a cobalt content in a raw material mixture (cf. Japanese Laid-Open Patent Publication No. Hei 6-338323).

Although studies are underway on control of a ratio of cobalt and lithium contained in a raw material mixture, as thus described, conventional active materials essentially have insufficient thermal stability. On this account, an active material prepared at any ratio tends to decompose while oxygen generates, when a battery goes into an overcharged state.

It is thought that stabilization of a crystal structure of an active material can be sought by baking a raw material mixture at a high temperature. When an active material is synthesized at an extremely high temperature, however, oxygen is released to cause occurrence of oxygen deficiency in the crystal structure of the active material. When the synthesis is conducted at a high temperature of 1000° C. or higher, for example, oxygen deficiency occurs in a large amount in the active material. A non-aqueous electrolyte secondary battery produced using such an active material undergoes a capacity decrease and significant deterioration in cycle characteristic.

Meanwhile, as another means for improving thermal resistance of lithium cobalt oxide, one of the typical positive electrode active materials, a proposal has been made that part of the Co atoms in $LiCoO_2$ be replaced with a different metal element (cf. Japanese Laid-Open Patent Publication No. 2002-198051). For example, addition of magnesium to a raw material mixture involves a certain degree of capacity decrease, but an active material crystal structure is stabilized. It is thereby possible to obtain an active material having relatively high thermal stability. Nevertheless, owing to concern about the aforesaid occurrence of oxygen deficiency in an active material crystal structure, synthesis of an active material at a substantially high temperature is not under study.

In the case where the raw material mixture is added with magnesium, a lithium amount becomes relatively small and an active material thus comes to contain MgO besides $Co_3O_4$. MgO may cause gas generation within a battery, and furthermore, when MgO is isolated, the stabilization of a crystal structure in line with the capacity decrease cannot be obtained.

BRIEF SUMMARY OF THE INVENTION

According to one aspect of the present invention, an Li amount is made excessive in a raw material mixture for use in synthesis of an active material, and then Mg is added to the raw material mixture so that sintering of particles can be prevented, and occurrence of lithium deficiency and oxygen deficiency can also be inhibited even in baking the raw material mixture at a temperature higher than conventionally adoptable.

According to another aspect of the present invention, it is possible to bake a raw material mixture of a positive electrode active material for a non-aqueous electrolyte secondary battery in a high temperature region, which has not been conventionally adopted by reason that oxygen deficiency may occur. By baking a raw material mixture at such a high temperature, stabilization of a crystal structure of a positive electrode active material as a product can be promoted, enabling fabrication of a non-aqueous electrolyte secondary battery capable of maintaining high thermal resistance even when overcharged.

Namely, the present invention relates to a method of producing a positive electrode active material for a non-aqueous electrolyte secondary battery, comprising the steps of: (a) preparing a raw material mixture, comprising "nx" mol of magnesium, "ny" mol of an element M where the element M is at least one selected from the group consisting of Al, Ti, Sr, Mn, Ni and Ca, "n(1−x−y)" mol of cobalt and "nz" mol of lithium, such that the values n, x, y and z satisfy $0<n$, $0.97 \leq (1/z) \leq 1$, $0.005 \leq x \leq 0.1$, and $0.001 \leq y \leq 0.03$;

and (b) baking the raw material mixture in an oxidization atmosphere at 1000 to 1100° C.

It is preferable that the production method of the present invention further comprise a step of re-baking the baked raw material mixture at 300 to 750° C., after the step (b).

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
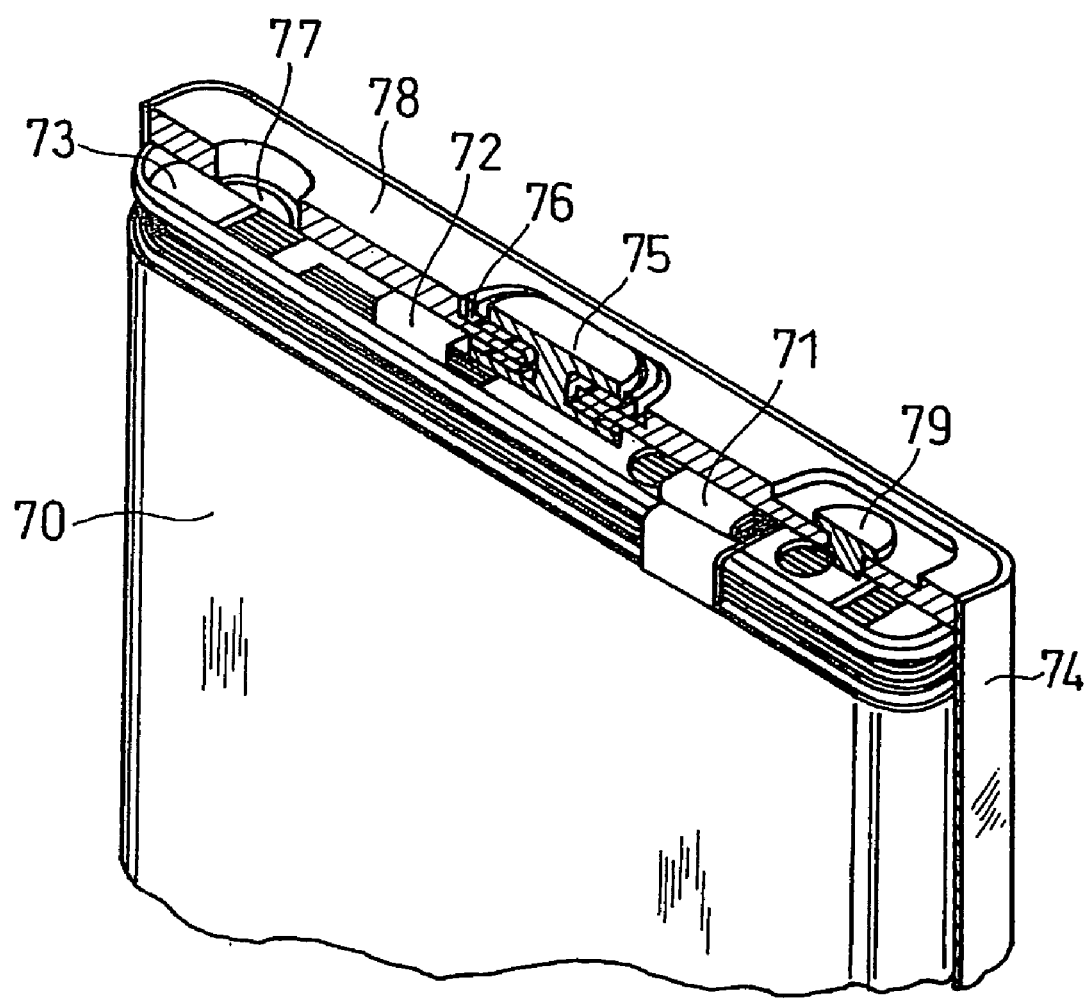
FIG. 1 is a partially cutaway oblique view of a non-aqueous electrolyte secondary battery in accordance with the present invention.

The production method of the present invention comprises the steps of (a) preparing a raw material mixture and (b) baking the raw material mixture in an oxidization atmosphere at 1000 to 1100° C.

The raw material mixture comprises a lithium source, a cobalt source, a magnesium source and an element M source. However, two or more sources selected from the cobalt source, the magnesium source and the element M source may form a compound. For example, a hydroxide or oxide of cobalt doped with magnesium can be used for the cobalt source and the magnesium source; a hydroxide or oxide of cobalt doped with magnesium and the element M can be used for the cobalt source, the magnesium source and the element M source.

As for the lithium source used can be lithium carbonate, lithium hydroxide, lithium nitrate, lithium sulfate, lithium oxide or the like. These may be used singly or in combination of two or more of them.

As for the cobalt source used can be basic cobalt carbonate, cobalt hydroxide, cobalt nitrate, cobalt sulfate, cobalt oxide, cobalt fluoride, or the like. These may be used singly or in combination of two or more of them.

As for the magnesium source used can be magnesium oxide, basic magnesium carbonate, magnesium chloride, magnesium fluoride, magnesium nitrate, magnesium sulfate, magnesium acetate, magnesium oxalate, magnesium sulfide, magnesium hydroxide, or the like. These may be used singly or in combination of two or more of them.

As for the element M source, below-described ones can for example be used.

As for an aluminum source used can be aluminum hydroxide, aluminum nitrate, aluminum oxide, aluminum fluoride, aluminum sulfate, or the like. These may be used singly or in combination of two or more of them.

As for a titanium source used can be titanium oxide, titanium fluoride, or the like. These may be used singly or in combination of two or more of them.

As for a strontium source used can be strontium oxide, strontium chloride, strontium carbonate, strontium oxalate, strontium fluoride, strontium sulfate, strontium nitrate, strontium hydroxide, strontium sulfide, or the like. These may be used singly or in combination of two or more of them.

As for a manganese source used can be manganese oxide, manganese hydroxide, manganese carbonate, manganese nitrate, manganese sulfate, manganese fluoride, manganese chloride, manganese oxyhydroxide, or the like. These may be used singly or in combination of two or more of them.

As for a nickel source used can be nickel hydroxide, nickel carbonate, nickel nitrate, nickel sulfate, nickel chloride, nickel oxide, or the like. These may be used singly or in combination of two or more of them.

As for a calcium source used can be calcium oxide, calcium chloride, calcium carbonate, calcium fluoride, calcium nitrate, calcium sulfate, calcium sulfide, calcium hydroxide, or the like. These may be used singly or in combination of two or more of them.

In the step (a), a raw material mixture (0<n), containing "nx" mol of magnesium, "ny" mol of the element M, "n(1−x−y)" mol of cobalt and "nz" mol of lithium, is prepared such that the values x, y and z satisfy:

$$0.97 \leq (1/z) \leq 1;$$

$$0.005 \leq x \leq 0.1; \text{ and}$$

$$0.001 \leq y \leq 0.03.$$

Therefore, the composition of the active material to be produced can be represented by $Li_zCo_{1-x-y}Mg_xM_yO_2$.

When $0.97 \leq (1/z) \leq 1$ is satisfied, even with raw materials for the active material baked at a high temperature, occurrence of lithium deficiency in the active material is inhibited, allowing production of an active material having a high structural stability. When 1/z is below 0.97, lithium becomes excess to cause the active material to demonstrate relatively strong alkalinity, which results in impairment of stability during formation of an electrode, and may result in corrosion of an Al core member. When 1/z is 1 or smaller, the effect of inhibiting the occurrence of lithium deficiency can be obtained, but it is particularly preferable that 1/z be 0.99 or smaller in order to further enhance the structural stability of the active material.

When 1/z exceeds 1, on the other hand, lithium required for synthesis of a high-performance active material runs short. Namely, a content of by-products, such as $Co_3O_4$, MgO or an oxide of the element M, in the active material increases, leading to gas generation within the battery due to $Co_3O_4$ or MgO, deterioration in thermal stability of the active material due to a relatively decreased amount of Mg in the active material, capacity reduction, or the like.

Magnesium is considered as being highly combinative to oxygen. It is therefore possible to obtain the effect of inhibiting occurrence of oxygen deficiency in the active material by addition of a magnesium source into a raw material mixture of the active material. Magnesium is also considered as having the effect of inhibiting sintering of particles in synthesis of the active material.

As thus described, the occurrence of lithium deficiency in the active material is inhibited by making the amount of Li, contained in the raw material mixture, excess, and furthermore, the occurrence of oxygen deficiency is also inhibited by addition of Mg. With the effect of the excessive Li and the effect of the added Mg simultaneously exerted, the raw material mixture can be baked at an extremely high temperature. That is to say, even when an active material mixture is baked at a high temperature of 1000° C. or higher, which has not hitherto been implemented, the occurrences of lithium deficiency and oxygen deficiency can be significantly inhibited. As a result of the baking at a high temperature, an active material mixture having extremely high crystallinity and excellent structural stability can be produced.

It is necessary for obtaining the aforesaid effect of Mg that x satisfy: $0.005 \leq x \leq 0.1$. When x is below 0.005, the Mg amount is too small for sufficiently obtaining the effect. When x is over 0.1, on the other hand, the Mg amount is so large as to raise a question of decreased capacity of the active material. In the range where the capacity decrease is allowable, however, a larger Mg amount is more preferable, and the x value preferably satisfies: $0.08 \leq x$.

The element M is required for improvement of a cycle characteristic. Among Al, Ti, Sr, Mn, Ni and Ca, it is particularly preferable to use Al, Mn or Ni. While it is necessary to satisfy at least: $0.001 \leq y$ for obtaining the effect of the element M, when $0.03 < y$, a problem arises as to a decrease in active material capacity.

In the step (b), the prepared raw material mixture was baked in an oxidization atmosphere at 1000 to 1100° C. When the baking temperature is below 1000° C., it is difficult to enhance crystallinity of the active material from the conventional level, and hence it is impossible to obtain a highly excellent active material in structural stability. When the baking temperature exceeds 1100° C., on the other hand, it becomes difficult to inhibit the lithium deficiency and the oxygen deficiency, causing deterioration in structural stability of the active material. The baking is preferably conducted for 5 to 20 hours.

In the production method of the present invention, it is possible to further inhibit the oxygen deficiency by re-baking the baked matter in an oxidization atmosphere at 300 to 750° C. after the step (b). For obtaining the effect of further inhibiting the oxygen deficiency, it is effective to re-bake the baked matter for 5 to 10 hours, while it depends on the baking temperature. It is preferable that the re-baking be conducted in an oxygen atmosphere or in an air atmosphere.

Next, the present invention is specifically described based on examples:

EXAMPLE 1

(i) Preparation of Positive Electrode Active Material

A hydroxide of cobalt doped with magnesium incorporated therein at a mole ratio of 0.945:0.05 was prepared.

The prepared hydroxide was mixed with aluminum hydroxide and lithium carbonate to obtain a raw material mixture containing cobalt, magnesium, aluminum and lithium at a mole ratio of 0.945:0.05:0.005:1.01.

Next, the obtained raw material mixture was baked in an air atmosphere at 1050° C. for 10 hours to obtain a positive electrode active material: $Li_{1.01}Co_{0.945}Mg_{0.05}Al_{0.005}O_2$. This active material satisfies: $1/z=0.99$, $x=0.05$ and $y=0.005$.

(ii) Production of Positive Electrode 100 parts by weight of the above obtained $Li_{1.01}Co_{0.945}Mg_{0.05}Al_{0.005}O_2$ was added with 3 parts by weight of acetylene black as a conductive agent, 7 parts by weight of polytetrafluoroethylene as a binder, and 100 parts by weight of a 1 wt % carboxymethyl cellulose aqueous solution, which was stirred and mixed to obtain a paste-like positive electrode material mixture. Subsequently, the positive electrode material mixture was applied onto each face of a core member made of aluminum foil having a thickness of 30 μm, followed by drying. The dried coated film together with the core member was rolled by pressure with a roller, which was then cut into a prescribed size to obtain a positive electrode. An aluminum-made positive electrode lead was welded to the obtained positive electrode.

(iii) Production of Negative Electrode

Flake graphite was ground and classified so as to have a mean particle size of about 20 μm. 100 parts by weight of the obtained flake graphite was added with 3 parts by weight of styrene/butadiene rubber as a binder and 100 parts by weight of a 1 wt % carboxymethyl cellulose aqueous solution, which was stirred and mixed to obtain a paste-like negative electrode material mixture. Subsequently, the negative electrode material mixture was applied onto each face of a core member made of copper foil having a thickness of 20 μm, followed by drying. The dried coated film together with the core member was rolled by pressure with a roller, which was then cut into a prescribed size to obtain a negative electrode. A nickel-made negative electrode lead was welded to the obtained negative electrode.

(iv) Non-aqueous Electrolyte $LiBF_4$ was dissolved, at a concentration of 1 mol/L, in a mixed solvent of 30 volume % of ethylene carbonate and 70 volume % of γ-butyrolactone, to prepare a non-aqueous electrolyte.

(v) Assembly of Battery

A prismatic lithium-ion secondary battery having a nominal capacity of 850 mAh as shown in FIG. 1 was assembled.

First, the positive electrode and the negative electrode were wound up via a separator made of a microporous polyethylene resin having a thickness of 25 μm to constitute an electrode assembly 70. An aluminum-made positive electrode lead 71 and a nickel-made negative electrode lead 72 were welded to the positive electrode and the negative electrode, respectively. An insulating plate 73 made of a polyethylene resin was applied onto the upper part of the electrode assembly, to be housed in a battery case 74. The other end of the positive electrode lead was spot-welded to the under surface of a sealing plate 78 having a prescribed safety valve 77. The other end of the negative electrode lead was electrically connected to the lower part of a nickel-made negative electrode terminal 75 having been inserted, via an insulating material 76, into a terminal aperture arranged in the central portion of the sealing plate. The open-end part of the battery case was laser-welded to the peripheral part of the sealing plate, and thereafter, a prescribed amount of the non-aqueous electrolyte was infused through an inlet provided in the sealing plate. Finally, the inlet was closed with an aluminum-made sealing stopper 79 and then closely sealed by laser-welding to complete a battery.

(vi) Evaluation

The obtained battery was charged at a current value of 1C until a battery voltage became 4.7 V. The battery in the overcharged state was then dismantled for taking the positive electrode out so that the positive electrode material mixture was obtained therefrom. Subsequently, in a DSC measurement (differential scanning calorimetry), the positive electrode material mixture was heated at a programming rate of 5° C./minute, and the oxygen generation behavior was investigated. A temperature with respective to each of the peaks of oxygen generation spectra (hereinafter referred to as peak temperature) is shown in Table 1.

EXAMPLES 2 TO 6

In Examples 2 to 6, in preparation of positive electrode active materials, titanium oxide, strontium hydroxide, manganese oxide, nickel hydroxide and calcium hydroxide were used, respectively, in place of aluminum hydroxide.

In the same manner as in Example 1 except for what was described above obtained respectively were: the positive electrode active material: $Li_{1.01}Co_{0.945}Mg_{0.05}Ti_{0.005}O_2$ in Example 2; the positive electrode active material: $Li_{1.01}Co_{0.945}Mg_{0.05}Sr_{0.005}O_2$ in Example 3; the positive electrode active material: $Li_{1.01}Co_{0.945}Mg_{0.05}Mn_{0.005}O_2$ in Example 4; the positive electrode active material: $Li_{1.01}Co_{0.945}Mg_{0.05}Ni_{0.005}O_2$ in Example 5; and the positive electrode active material: $Li_{1.01}Co_{0.945}Mg_{0.05}Ca_{0.005}O_2$ in Example 6.

These active materials satisfy: $1/z=0.99$, $x=0.05$ and $y=0.005$.

In each of Examples, a prismatic lithium-ion secondary battery was assembled in the same manner as in Example 1 except for the use of the aforesaid active material, and the battery was evaluated in the same manner as in Example 1. The results are shown in Table 1.

TABLE 1

|  | Composition | 1/z | Baking Temp. | Peak Temp. |
| --- | --- | --- | --- | --- |
| Ex. 1 | $Li_{1.01}Co_{0.945}Mg_{0.05}Al_{0.005}O_2$ | 0.99 | 1050° C. | 241° C. |
| Ex. 2 | $Li_{1.01}Co_{0.945}Mg_{0.05}Ti_{0.005}O_2$ | 0.99 | 1050° C. | 236° C. |
| Ex. 3 | $Li_{1.01}Co_{0.945}Mg_{0.05}Sr_{0.005}O_2$ | 0.99 | 1050° C. | 239° C. |
| Ex. 4 | $Li_{1.01}Co_{0.945}Mg_{0.05}Mn_{0.005}O_2$ | 0.99 | 1050° C. | 231° C. |
| Ex. 5 | $Li_{1.01}Co_{0.945}Mg_{0.05}Ni_{0.005}O_2$ | 0.99 | 1050° C. | 233° C. |
| Ex. 6 | $Li_{1.01}Co_{0.945}Mg_{0.05}Ca_{0.005}O_2$ | 0.99 | 1050° C. | 240° C. |

EXAMPLE 7

Except that the raw material mixture was baked in an air atmosphere at 1050° C. for 10 hours and then re-baked in an air atmosphere at 700° C. for 10 hours, a positive electrode active material: $Li_{1.01}Co_{0.945}Mg_{0.05}Al_{0.005}O_2$ was obtained in the same manner as in Example 1. This active material satisfies: $1/z=0.99$, $x=0.05$, $y=0.005$.

A prismatic lithium ion secondary battery was assembled in the same manner as in Example 1 except for the use of the above obtained active material, and the battery was evaluated in the same manner as in Example 1. The result is shown in Table 2.

EXAMPLES 8 TO 12

In Examples 8 to 12, in preparation of positive electrode active materials, titanium oxide, strontium hydroxide, manganese oxide, nickel hydroxide and calcium hydroxide were used, respectively, in place of aluminum hydroxide.

In the same manner as in Example 7 except for what was described above obtained respectively were: the positive electrode active material: $Li_{1.01}Co_{0.945}Mg_{0.05}Ti_{0.005}O_2$ in Example 8; the positive electrode active material: $Li_{1.01}Co_{0.945}Mg_{0.05}Sr_{0.005}O_2$ in Example 9; the positive-electrode active material: $Li_{1.01}Co_{0.945}Mg_{0.05}Mn_{0.005}O_2$ in Example 10; the positive electrode active material: $Li_{1.01}Co_{0.945}Mg_{0.05}Ni_{0.005}O_2$ in Example 11; and the positive electrode active material: $Li_{1.01}Co_{0.945}Mg_{0.05}Ca_{0.005}O_2$ in Example 12.

These active materials satisfy: $1/z=0.99$, $x=0.05$ and $y=0.005$.

In each of Examples, a prismatic lithium-ion secondary battery was assembled in the same manner as in Example 1 except for the use of the aforesaid active material, and the battery was evaluated in the same manner as in Example 1. The results are shown in Table 2.

TABLE 2

|  | Composition | 1/z | Baking Temp. | Re-baking Temp. | Peak Temp. |
| --- | --- | --- | --- | --- | --- |
| Ex. 7 | $Li_{1.01}Co_{0.945}Mg_{0.05}Al_{0.005}O_2$ | 0.99 | 1050° C. | 700° C. | 251° C. |
| Ex. 8 | $Li_{1.01}Co_{0.945}Mg_{0.05}Ti_{0.005}O_2$ | 0.99 | 1050° C. | 700° C. | 243° C. |
| Ex. 9 | $Li_{1.01}Co_{0.945}Mg_{0.05}Sr_{0.005}O_2$ | 0.99 | 1050° C. | 700° C. | 250° C. |
| Ex. 10 | $Li_{1.01}Co_{0.945}Mg_{0.05}Mn_{0.005}O_2$ | 0.99 | 1050° C. | 700° C. | 249° C. |
| Ex. 11 | $Li_{1.01}Co_{0.945}Mg_{0.05}Ni_{0.005}O_2$ | 0.99 | 1050° C. | 700° C. | 246° C. |
| Ex. 12 | $Li_{1.01}Co_{0.945}Mg_{0.05}Ca_{0.005}O_2$ | 0.99 | 1050° C. | 700° C. | 250° C. |

COMPARATIVE EXAMPLE 1

Cobalt oxide as a cobalt source and lithium carbonate as a lithium source were mixed to obtain a raw material mixture containing cobalt and lithium at a mole ratio of 1:1.01.

Next, the obtained raw material mixture was baked in an air atmosphere at 900° C. for 10 hours to obtain a positive electrode active material: $Li_{1.01}CoO_2$.

A prismatic lithium-ion secondary battery was assembled in the same manner as in Example 1 except for the use of the active material obtained here, and the assembled battery was evaluated in the same manner as in Example 1. The results are shown in Table 3.

COMPARATIVE EXAMPLE 2

A raw material mixture prepared in the same manner as in Comparative Example 1 was baked in an air atmosphere at 1050° C. for 10 hours to obtain a positive electrode active material: $Li_{1.01}CoO_2$.

A prismatic lithium-ion secondary battery was assembled in the same manner as in Example 1 except for the use of the active material obtained here, and the battery was evaluated in the same manner as in Example 1. The result is shown in Table 3.

COMPARATIVE EXAMPLE 3

A raw material mixture prepared in the same manner as in Comparative Example 1 was baked in an air atmosphere at 1050° C. for 10 hours, and then re-baked in an air atmosphere at 700° C. for 10 hours to obtain a positive electrode active material: $Li_{1.01}CoO_2$.

A prismatic lithium-ion secondary battery was assembled in the same manner as in Example 1 except for the use of the active material obtained here, and the battery was evaluated in the same manner as in Example 1. The result is shown in Table 3.

TABLE 3

| | Composition | 1/z | Baking Temp. | Re-baking Temp. | Peak Temp. |
|---|---|---|---|---|---|
| Comp. Ex. 1 | $Li_{1.01}CoO_2$ | 0.99 | 900° C. | — | 112° C. |
| Comp. Ex. 2 | $Li_{1.01}CoO_2$ | 0.99 | 1050° C. | — | 112° C. |
| Comp. Ex. 3 | $Li_{1.01}CoO_2$ | 0.99 | 1050° C. | 700° C. | 124° C. |

COMPARATIVE EXAMPLE 4

A raw material mixture prepared in the same manner as in Example 1 was baked in an air atmosphere at 900° C. for 10 hours to obtain a positive electrode active material: $Li_{1.01}Co_{0.945}Mg_{0.05}Al_{0.005}O_2$. This active material satisfies: 1/z=0.99, x=0.05, y=0.005.

A prismatic lithium-ion secondary battery was assembled in the same manner as in Example 1 except for the use of the active material obtained here, and the battery was evaluated in the same manner as in Example 1. The result is shown in Table 4.

COMPARATIVE EXAMPLES 5 to 9

In Comparative Examples 5 to 9, in preparation of positive electrode active materials, titanium oxide, strontium hydroxide, manganese oxide, nickel hydroxide and calcium hydroxide were used, respectively, in place of aluminum hydroxide.

In the same manner as in Comparative Example 4 except for what was described above obtained respectively were: the positive electrode active material: $Li_{1.01}Co_{0.945}Mg_{0.05}Ti_{0.005}O_2$ in Comparative Example 5; the positive electrode active material: $Li_{1.01}Co_{0.945}Mg_{0.05}Sr_{0.005}O_2$ in Comparative Example 6; the positive electrode active material: $Li_{1.01}Co_{0.945}Mg_{0.05}Mn_{0.005}O_2$ in Comparative Example 7; the positive electrode active material: $Li_{1.01}Co_{0.945}Mg_{0.05}Ni_{0.005}O_2$ in Comparative Example 8; and the positive electrode active material: $Li_{1.01}Co_{0.945}Mg_{0.05}Ca_{0.005}O_2$ in Comparative Example 9.

These active materials satisfy: 1/z=0.99, x=0.05 and y=0.005.

In each of Comparative Examples, a prismatic lithium-ion secondary battery was assembled in the same manner as in Example 1 except for the use of the aforesaid active material, and the battery was evaluated in the same manner as in Example 1. The results are shown in Table 4.

TABLE 4

| | Composition | 1/z | Baking Temp. | Peak Temp. |
|---|---|---|---|---|
| Comp. Ex. 4 | $Li_{1.01}Co_{0.945}Mg_{0.05}Al_{0.005}O_2$ | 0.99 | 900° C. | 120° C. |
| Comp. Ex. 5 | $Li_{1.01}Co_{0.945}Mg_{0.05}Ti_{0.005}O_2$ | 0.99 | 900° C. | 118° C. |
| Comp. Ex. 6 | $Li_{1.01}Co_{0.945}Mg_{0.05}Sr_{0.005}O_2$ | 0.99 | 900° C. | 121° C. |
| Comp. Ex. 7 | $Li_{1.01}Co_{0.945}Mg_{0.05}Mn_{0.005}O_2$ | 0.99 | 900° C. | 119° C. |
| Comp. Ex. 8 | $Li_{1.01}Co_{0.945}Mg_{0.05}Ni_{0.005}O_2$ | 0.99 | 900° C. | 117° C. |
| Comp. Ex. 9 | $Li_{1.01}Co_{0.945}Mg_{0.05}Ca_{0.005}O_2$ | 0.99 | 900° C. | 120° C. |

COMPARATIVE EXAMPLE 10

The hydroxide of cobalt doped with magnesium prepared in the same manner as in Example 1 was mixed with aluminum hydroxide and lithium carbonate to obtain a raw material mixture containing cobalt, magnesium, aluminum and lithium at a mole ratio of 0.945:0.05:0.005:0.97.

Next, the obtained raw material mixture was baked in an air atmosphere at 1050° C. for 10 hours to obtain a positive electrode active material: $Li_{0.97}Co_{0.945}Mg_{0.05}Al_{0.005}O_2$. This active material satisfies: 1/z=1.03, x=0.05 and y=0.005.

A prismatic lithium-ion secondary battery was assembled in the same manner as in Example 1 except for the use of the active material obtained here, and the battery was evaluated in the same manner as in Example 1. The result is shown in Table 5.

COMPARATIVES EXAMPLES 11 TO 15

In Comparative Examples 11 to 15, in preparation of positive electrode active materials, titanium oxide, strontium hydroxide, manganese oxide, nickel hydroxide and calcium hydroxide were used, respectively, in place of aluminum hydroxide.

In the same manner as in Comparative Example 10 except for what was described above obtained respectively were: the positive electrode active material: $Li_{0.97}Co_{0.945}Mg_{0.05}Ti_{0.005}O_2$ in Comparative Example 11; the positive electrode active material: $Li_{0.97}Co_{0.945}Mg_{0.05}Sr_{0.005}O_2$ in Comparative Example 12; the positive electrode active material: $Li_{0.97}Co_{0.945}Mg_{0.05}Mn_{0.005}O_2$ in Comparative Example 13; the positive electrode active material: $Li_{0.97}Co_{0.945}Mg_{0.05}Ni_{0.005}O_2$ in Comparative Example 14; and the positive electrode active material: $Li_{0.97}Co_{0.945}Mg_{0.05}Ca_{0.005}O_2$ in Comparative Example 15.

These active materials satisfy: 1/z=1.03, x=0.05 and y=0.005.

In each of Comparative Examples, a prismatic lithium-ion secondary battery was assembled in the same manner as in Example 1 except for the use of the aforesaid active material, and the battery was evaluated in the same manner as in Example 1. The results are shown in Table 5.

TABLE 5

| | Composition | 1/z | Baking Temp. | Peak Temp. |
|---|---|---|---|---|
| Comp. Ex. 10 | $Li_{0.97}Co_{0.945}Mg_{0.05}Al_{0.005}O_2$ | 1.03 | 1050° C. | 115° C. |

TABLE 5-continued

|  | Composition | 1/z | Baking Temp. | Peak Temp. |
|---|---|---|---|---|
| Comp. Ex. 11 | $Li_{0.97}Co_{0.945}Mg_{0.05}Ti_{0.005}O_2$ | 1.03 | 1050° C. | 112° C. |
| Comp. Ex. 12 | $Li_{0.97}Co_{0.945}Mg_{0.05}Sr_{0.005}O_2$ | 1.03 | 1050° C. | 120° C. |
| Comp. Ex. 13 | $Li_{0.97}Co_{0.945}Mg_{0.05}Mn_{0.005}O_2$ | 1.03 | 1050° C. | 115° C. |
| Comp. Ex. 14 | $Li_{0.97}Co_{0.945}Mg_{0.05}Ni_{0.005}O_2$ | 1.03 | 1050° C. | 114° C. |
| Comp. Ex. 15 | $Li_{0.97}Co_{0.945}Mg_{0.05}Ca_{0.005}O_2$ | 1.03 | 1050° C. | 120° C. |

EXAMPLES 13 TO 15 AND COMPARATIVE EXAMPLES 16 TO 18

Next, a more detailed study was conducted on a baking temperature for a raw material mixture.

Specifically, a positive electrode active material: $Li_{1.01}Co_{0.945}Mg_{0.05}Al_{0.005}O_2$ was obtained in the same manner as in Example 1 except that the baking temperature for the raw material mixture was varied as shown in Table 6. A prismatic lithium-ion secondary battery was assembled in the same manner as in Example 1 except for the use of the aforesaid active material, and the battery was evaluated in the same manner as in Example 1. The results are shown in Table 6.

As seen in Table 6, when the baking temperature was in a low temperature region below 1000° C., and in a high temperature region over 1100° C., the thermal resistance of the active material during overcharging significantly deteriorated.

TABLE 6

|  | Composition | 1/z | Baking Temp. | Peak Temp. |
|---|---|---|---|---|
| Comp. Ex. 16 | $Li_{1.01}Co_{0.945}Mg_{0.05}Al_{0.005}O_2$ | 0.99 | 900° C. | 120° C. |
| Comp. Ex. 17 | $Li_{1.01}Co_{0.945}Mg_{0.05}Al_{0.005}O_2$ | 0.99 | 980° C. | 128° C. |
| Ex. 13 | $Li_{1.01}Co_{0.945}Mg_{0.05}Al_{0.005}O_2$ | 0.99 | 1000° C. | 203° C. |
| Ex. 14 | $Li_{1.01}Co_{0.945}Mg_{0.05}Al_{0.005}O_2$ | 0.99 | 1050° C. | 241° C. |
| Ex. 15 | $Li_{1.01}Co_{0.945}Mg_{0.05}Al_{0.005}O_2$ | 0.99 | 1100° C. | 211° C. |
| Comp. Ex. 18 | $Li_{1.01}Co_{0.945}Mg_{0.05}Al_{0.005}O_2$ | 0.99 | 1120° C. | 160° C. |

EXAMPLES 16 TO 19 AND COMPARATIVE EXAMPLES 19 TO 20

Next, a more detailed study was conducted on an Li content (1/z value) in an active material.

Specifically, a positive electrode active material having the composition shown in Table 7 was obtained in the same manner as in Example 1 except that the composition of the raw material mixture was varied. A prismatic lithium-ion secondary battery was assembled in the same manner as in Example 1 except for the use of the aforesaid active material, and the battery was evaluated in the same manner as in Example 1. The results are shown in Table 7.

As apparent from Table 7, when 1/z was 1.01, the active material had low thermal resistance during overcharging, and further, the capacity thereof decreased. On the other hand, when 1/z was below 0.97, i.e. 0.96, the active material had excellent thermal resistance during overcharging, but had strong alkalinity, and it was thereby difficult to produce a stable electrode plate.

TABLE 7

|  | Composition | 1/z | Baking Temp. | Peak Temp. |
|---|---|---|---|---|
| Comp. Ex. 19 | $Li_{1.04}Co_{0.945}Mg_{0.05}Al_{0.005}O_2$ | 0.96 | 1050° C. | 239° C. |
| Ex. 16 | $Li_{1.03}Co_{0.945}Mg_{0.05}Al_{0.005}O_2$ | 0.97 | 1050° C. | 240° C. |
| Ex. 17 | $Li_{1.01}Co_{0.945}Mg_{0.05}Al_{0.005}O_2$ | 0.99 | 1050° C. | 241° C. |
| Ex. 18 | $Li_{1.005}Co_{0.945}Mg_{0.05}Al_{0.005}O_2$ | 0.995 | 1050° C. | 224° C. |
| Ex. 19 | $Li_{1.00}Co_{0.945}Mg_{0.05}Al_{0.005}O_2$ | 1.00 | 1050° C. | 219° C. |
| Comp. Ex. 20 | $Li_{0.97}Co_{0.945}Mg_{0.05}Al_{0.005}O_2$ | 1.01 | 1050° C. | 115° C. |

EXAMPLES 20 TO 26 AND COMPARATIVE EXAMPLE 21

Next, a more detailed study was conducted on an Mg content (x value) in an active material.

Specifically, a positive electrode active material having the composition shown in Table 8 was obtained in the same manner as in Example 1 except that the composition of the raw material mixture was varied. A prismatic lithium-ion secondary battery was assembled in the same manner as in Example 1 except for the use of the aforesaid active material, and the battery was evaluated in the same manner as in Example 1. The results are shown in Table 8.

As clear from Table 8, when x was below 0.005, i.e. 0.004, the amount of Mg was so small that the thermal resistance of the active material significantly deteriorated; when x was 0.005 or larger, all the active materials exhibited excellent thermal resistance.

TABLE 8

|  | Composition | x | 1/z | Baking Temp. | Peak Temp. |
|---|---|---|---|---|---|
| Comp. Ex. 21 | $Li_{1.01}Co_{0.991}Mg_{0.004}Al_{0.005}O_2$ | 0.004 | 0.99 | 1050° C. | 129° C. |
| Ex. 20 | $Li_{1.01}Co_{0.99}Mg_{0.005}Al_{0.005}O_2$ | 0.005 | 0.99 | 1050° C. | 222° C. |

TABLE 8-continued

|  | Composition | x | 1/z | Baking Temp. | Peak Temp. |
|---|---|---|---|---|---|
| Ex. 21 | $Li_{1.01}Co_{0.985}Mg_{0.01}Al_{0.005}O_2$ | 0.01 | 0.99 | 1050° C. | 223° C. |
| Ex. 22 | $Li_{1.01}Co_{0.975}Mg_{0.02}Al_{0.005}O_2$ | 0.02 | 0.99 | 1050° C. | 226° C. |
| Ex. 23 | $Li_{1.01}Co_{0.965}Mg_{0.03}Al_{0.005}O_2$ | 0.03 | 0.99 | 1050° C. | 234° C. |
| Ex. 24 | $Li_{1.01}Co_{0.945}Mg_{0.05}Al_{0.005}O_2$ | 0.05 | 0.99 | 1050° C. | 241° C. |
| Ex. 25 | $Li_{1.01}Co_{0.915}Mg_{0.08}Al_{0.005}O_2$ | 0.08 | 0.99 | 1050° C. | 250° C. |
| Ex. 26 | $Li_{1.01}Co_{0.895}Mg_{0.1}Al_{0.005}O_2$ | 0.1 | 0.99 | 1050° C. | 251° C. |

EXAMPLES 27 TO 30 AND COMPARATIVE EXAMPLES 22 TO 23

Next, a more detailed study was conducted on an Al content (y value) in an active material when Al was used as the element M.

Specifically, a positive electrode active material having the composition shown in Table 9 was obtained in the same manner as in Example 1 except that the composition of the raw material mixture was varied. A prismatic lithium-ion secondary battery was assembled in the same manner as in Example 1 except for the use of the aforesaid active material, and the battery was evaluated in the same manner as in Example 1. The results are shown in Table 9.

TABLE 9

|  | Composition | y | 1/z | Baking Temp. | Peak Temp. |
|---|---|---|---|---|---|
| Comp. Ex. 22 | $Li_{1.01}Co_{0.9492}Mg_{0.05}Al_{0.0008}O_2$ | 0.0008 | 0.99 | 1050° C. | 232° C. |
| Ex. 27 | $Li_{1.01}Co_{0.949}Mg_{0.05}Al_{0.001}O_2$ | 0.001 | 0.99 | 1050° C. | 236° C. |
| Ex. 28 | $Li_{1.01}Co_{0.945}Mg_{0.05}Al_{0.005}O_2$ | 0.005 | 0.99 | 1050° C. | 241° C. |
| Ex. 29 | $Li_{1.01}Co_{0.94}Mg_{0.05}Al_{0.01}O_2$ | 0.01 | 0.99 | 1050° C. | 241° C. |
| Ex. 30 | $Li_{1.01}Co_{0.93}Mg_{0.05}Al_{0.03}O_2$ | 0.03 | 0.99 | 1050° C. | 242° C. |
| Comp. Ex. 23 | $Li_{1.01}Co_{0.9}Mg_{0.05}Al_{0.05}O_2$ | 0.05 | 0.99 | 1050° C. | 241° C. |

EXAMPLES 31 TO 34 AND COMPARATIVE EXAMPLES 24 TO 25

Next, a more detailed study was conducted on a Ti content (y value) in an active material when Ti was used as the element M.

Specifically, a positive electrode active material having the composition shown in Table 10 was obtained in the same manner as in Example 2 except that the composition of the raw material mixture was varied. A prismatic lithium-ion secondary battery was assembled in the same manner as in Example 1 except for the use of the aforesaid active material, and the battery was evaluated in the same manner as in Example 1. The results are shown in Table 10.

TABLE 10

|  | Composition | y | 1/z | Baking Temp. | Peak Temp. |
|---|---|---|---|---|---|
| Comp. Ex. 24 | $Li_{1.01}Co_{0.9492}Mg_{0.05}Ti_{0.0008}O_2$ | 0.0008 | 0.99 | 1050° C. | 229° C. |
| Ex. 31 | $Li_{1.01}Co_{0.949}Mg_{0.05}Ti_{0.001}O_2$ | 0.001 | 0.99 | 1050° C. | 229° C. |
| Ex. 32 | $Li_{1.01}Co_{0.945}Mg_{0.05}Ti_{0.005}O_2$ | 0.005 | 0.99 | 1050° C. | 236° C. |
| Ex. 33 | $Li_{1.01}Co_{0.94}Mg_{0.05}Ti_{0.01}O_2$ | 0.01 | 0.99 | 1050° C. | 235° C. |
| Ex. 34 | $Li_{1.01}Co_{0.93}Mg_{0.05}Ti_{0.03}O_2$ | 0.03 | 0.99 | 1050° C. | 236° C. |
| Comp. Ex. 25 | $Li_{1.01}Co_{0.9}Mg_{0.05}Ti_{0.05}O_2$ | 0.05 | 0.99 | 1050° C. | 235° C. |

EXAMPLES 35 TO 38 AND COMPARATIVE EXAMPLES 26 to 27

Next, a more detailed study was conducted on an Sr content (y value) in an active material when Sr was used as the element M.

Specifically, a positive electrode active material having the composition shown in Table 11 was obtained in the same manner as in Example 3 except that the composition of the raw material mixture was varied. A prismatic lithium-ion secondary battery was assembled in the same manner as in Example 1 except for the use of the aforesaid active material, and the battery was evaluated in the same manner as in Example 1. The results are shown in Table 11.

TABLE 11

| | Composition | y | 1/z | Baking Temp. | Peak Temp. |
|---|---|---|---|---|---|
| Comp. Ex. 26 | $Li_{1.01}Co_{0.9492}Mg_{0.05}Sr_{0.0008}O_2$ | 0.0008 | 0.99 | 1050° C. | 231° C. |
| Ex. 35 | $Li_{1.01}Co_{0.949}Mg_{0.05}Sr_{0.001}O_2$ | 0.001 | 0.99 | 1050° C. | 234° C. |
| Ex. 36 | $Li_{1.01}Co_{0.945}Mg_{0.05}Sr_{0.005}O_2$ | 0.005 | 0.99 | 1050° C. | 239° C. |
| Ex. 37 | $Li_{1.01}Co_{0.94}Mg_{0.05}Sr_{0.01}O_2$ | 0.01 | 0.99 | 1050° C. | 241° C. |
| Ex. 38 | $Li_{1.01}Co_{0.93}Mg_{0.05}Sr_{0.03}O_2$ | 0.03 | 0.99 | 1050° C. | 240° C. |
| Comp. Ex. 27 | $Li_{1.01}Co_{0.9}Mg_{0.05}Sr_{0.05}O_2$ | 0.05 | 0.99 | 1050° C. | 240° C. |

EXAMPLES 39 TO 42 AND COMPARATIVE EXAMPLES 28 to 29

Next, a more detailed study was conducted on an Mn content (y value) in an active material when Mn was used as the element M.

Specifically, a positive electrode active material having the composition shown in Table 12 was obtained in the same manner as in Example 4 except that the composition of the raw material mixture was varied. A prismatic lithium-ion secondary battery was assembled in the same manner as in Example 1 except for the use of the aforesaid active material, and the battery was evaluated in the same manner as in Example 1. The results are shown in Table 12.

TABLE 12

| | Composition | y | 1/z | Baking Temp. | Peak Temp. |
|---|---|---|---|---|---|
| Comp. Ex. 28 | $Li_{1.01}Co_{0.9492}Mg_{0.05}Mn_{0.0008}O_2$ | 0.0008 | 0.99 | 1050° C. | 228° C. |
| Ex. 39 | $Li_{1.01}Co_{0.949}Mg_{0.05}Mn_{0.001}O_2$ | 0.001 | 0.99 | 1050° C. | 229° C. |
| Ex. 40 | $Li_{1.01}Co_{0.945}Mg_{0.05}Mn_{0.005}O_2$ | 0.005 | 0.99 | 1050° C. | 231° C. |
| Ex. 41 | $Li_{1.01}Co_{0.94}Mg_{0.05}Mn_{0.01}O_2$ | 0.01 | 0.99 | 1050° C. | 233° C. |
| Ex. 42 | $Li_{1.01}Co_{0.93}Mg_{0.05}Mn_{0.03}O_2$ | 0.03 | 0.99 | 1050° C. | 234° C. |
| Comp. Ex. 29 | $Li_{1.01}Co_{0.9}Mg_{0.05}Mn_{0.05}O_2$ | 0.05 | 0.99 | 1050° C. | 232° C. |

EXAMPLES 43 TO 46 AND COMPARATIVE EXAMPLES 30 TO 31

Next, a more detailed study was conducted on an Ni content (y value) in an active material when Ni was used as the element M.

Specifically, a positive electrode active material having the composition shown in Table 13 was obtained in the same manner as in Example 5 except that the composition of the raw material mixture was varied. A prismatic lithium-ion secondary battery was assembled in the same manner as in Example 1 except for the use of the aforesaid active material, and the battery was evaluated in the same manner as in Example 1. The results are shown in Table 13.

TABLE 13

| | Composition | y | 1/z | Baking Temp. | Peak Temp. |
|---|---|---|---|---|---|
| Comp. Ex. 30 | $Li_{1.01}Co_{0.9492}Mg_{0.05}Ni_{0.0008}O_2$ | 0.0008 | 0.99 | 1050° C. | 228° C. |
| Ex. 43 | $Li_{1.01}Co_{0.949}Mg_{0.05}Ni_{0.001}O_2$ | 0.001 | 0.99 | 1050° C. | 228° C. |
| Ex. 44 | $Li_{1.01}Co_{0.945}Mg_{0.05}Ni_{0.005}O_2$ | 0.005 | 0.99 | 1050° C. | 233° C. |
| Ex. 45 | $Li_{1.01}Co_{0.94}Mg_{0.05}Ni_{0.01}O_2$ | 0.01 | 0.99 | 1050° C. | 233° C. |
| Ex. 46 | $Li_{1.01}Co_{0.93}Mg_{0.05}Ni_{0.03}O_2$ | 0.03 | 0.99 | 1050° C. | 233° C. |
| Comp. Ex. 31 | $Li_{1.01}Co_{0.9}Mg_{0.05}Ni_{0.05}O_2$ | 0.05 | 0.99 | 1050° C. | 234° C. |

EXAMPLES 47 TO 50 AND COMPARATIVE EXAMPLES 32 TO 33

Next, a more detailed study was conducted on a Ca content (y value) in an active material when Ca was used as the element M.

Specifically, a positive electrode active material having the composition shown in Table 14 was obtained in the same manner as in Example 6 except that the composition of the raw material mixture was varied. A prismatic lithium-ion secondary battery was assembled in the same manner as in Example 1 except for the use of the aforesaid active material, and the battery was evaluated in the same manner as in Example 1. The results are shown in Table 14.

TABLE 14

|  | Composition | y | 1/z | Baking Temp. | Peak Temp. |
|---|---|---|---|---|---|
| Comp. Ex. 32 | $Li_{1.01}Co_{0.9492}Mg_{0.05}Ca_{0.0008}O_2$ | 0.0008 | 0.99 | 1050° C. | 236° C. |
| Ex. 47 | $Li_{1.01}Co_{0.949}Mg_{0.05}Ca_{0.001}O_2$ | 0.001 | 0.99 | 1050° C. | 235° C. |
| Ex. 48 | $Li_{1.01}Co_{0.945}Mg_{0.05}Ca_{0.005}O_2$ | 0.005 | 0.99 | 1050° C. | 240° C. |
| Ex. 49 | $Li_{1.01}Co_{0.94}Mg_{0.05}Ca_{0.01}O_2$ | 0.01 | 0.99 | 1050° C. | 240° C. |
| Ex. 50 | $Li_{1.01}Co_{0.93}Mg_{0.05}Ca_{0.03}O_2$ | 0.03 | 0.99 | 1050° C. | 241° C. |
| Comp. Ex. 33 | $Li_{1.01}Co_{0.9}Mg_{0.05}Ca_{0.05}O_2$ | 0.05 | 0.99 | 1050° C. | 240° C. |

It is to be noted that when the charge/discharge cycles of the same battery as the battery obtained in each of Examples were repeated in the voltage range of 3 V to 4.2 V, deterioration in cycle characteristic was observed in the range of y<0.001. In the range of 0.03<y, on the other hand, the cycle characteristic was improved, but the capacity decreased as the heteroelement increased.

It is important, for obtaining the element-M-producing effect of improving a cycle characteristic, to make active materials uniformly react. In the present invention, the solid phase reaction is sufficiently promoted because the raw material mixture is baked at a high temperature of 1000° C. or higher, and it is thought that the cycle characteristic significantly improves in the range of $0.001 \leq y$.

As apparent from Tables 1 to 14, the peak temperature of the oxygen generation spectrum in each of Examples increased dramatically, as compared to that in each of Comparative Examples. As thus described, according to the present invention, it is possible to bake a raw material mixture at a temperature higher than conventionally adoptable, by making an Li amount excessive and then adding Mg to a raw material mixture, so that stability of a crystal structure of a positive electrode active material as a product can be significantly improved. It is therefore possible to obtain a non-aqueous electrolyte secondary battery capable of maintaining high thermal resistance even when overcharged. Furthermore, in the present invention, because the raw material mixture containing the element M is baked at a high temperature, a cycle characteristic improves significantly.

As stated above, according to the present invention, it is possible to promote stabilization of a positive electrode active material crystal structure, and to obtain a non-aqueous electrolyte secondary battery capable of maintaining high thermal resistance even when overcharged, and it is also possible to promote improvement of a cycle characteristic.

Although the present invention has been described in terms of the presently preferred embodiments, it is to be understood that such disclosure is not to be interpreted as limiting. Various alternations and modifications will no doubt become apparent to those skilled in the art to which the present invention pertains, after having read the above disclosure. Accordingly, it is intended that the appended claims be interpreted as covering all alternations and modifications as fall within the true spirit and scope of the invention.

The invention claimed is:

1. A method of producing a positive electrode active material for a non-aqueous electrolyte secondary battery, comprising the steps of:
   (a) preparing a raw material mixture, comprising
       "nx" mol of magnesium,
       "ny" mol of an element M, said element M being at least one selected from the group consisting of Al, Ti, Sr, Mn, Ni and Ca,
       "n(1−x−y)" mol of cobalt and
       "nz" mol of lithium,
   such that the values n, x, y and z satisfy
       0<n,
       $0.97 \leq (1/z) \leq 1$,
       $0.005 \leq x \leq 0.1$, and
       $0.001 \leq y \leq 0.03$; and
   (b) baking said raw material mixture in an oxidization atmosphere at 1000 to 1100° C.

2. The method of producing a positive electrode active material for a non-aqueous electrolyte secondary battery in accordance with claim 1, comprising a step of re-baking said baked raw material mixture at 300 to 750° C., after said step (b).

3. The method of producing a positive electrode active material for a non-aqueous electrolyte secondary battery in accordance with claim 1, wherein said raw material mixture contains a hydroxide or oxide of cobalt doped with magnesium.

* * * * *